US007637728B2

(12) United States Patent
Roemer et al.

(10) Patent No.: US 7,637,728 B2
(45) Date of Patent: Dec. 29, 2009

(54) ROTARY TABLET PRESS

(75) Inventors: Harald Roemer, Reinbek (DE); Wolfgang Soltau, Neu Darchau/Katemin (DE); Kai Huebner, Ratzeburg (DE); Hans Wolf, Schwarzenbek (DE)

(73) Assignee: Fette GmbH, Schwarzenbek (DE)

( * ) Notice: Subject to any disclaimer, the term of this patent is extended or adjusted under 35 U.S.C. 154(b) by 0 days.

(21) Appl. No.: 12/209,823

(22) Filed: Sep. 12, 2008

(65) Prior Publication Data

US 2009/0072491 A1 Mar. 19, 2009

(30) Foreign Application Priority Data

Sep. 13, 2007 (DE) ...................... 10 2007 043 583

(51) Int. Cl.
*B29C 43/08* (2006.01)

(52) U.S. Cl. ......................... 425/73; 425/210; 425/345

(58) Field of Classification Search .................. 425/73, 425/210, 225, 234, 344–345, 353–355
See application file for complete search history.

(56) References Cited

U.S. PATENT DOCUMENTS 4,259,049 A 3/1981 Willich
5,698,238 A * 12/1997 Fabbri ........................ 425/345
6,676,836 B2 1/2004 Mandt
6,676,863 B2 * 1/2004 Christiaens et al. ......... 425/345
6,997,691 B2 * 2/2006 Trebbi et al. ................ 425/345

FOREIGN PATENT DOCUMENTS

DE 10 2004 040 163 B3 4/2006
EP 0 288 798 8/1988

* cited by examiner

*Primary Examiner*—Yogendra Gupta
*Assistant Examiner*—Thu Khanh T Nguyen
(74) *Attorney, Agent, or Firm*—Vidas, Arrett & Steinkraus, P.A.

(57) ABSTRACT

A rotary tablet press, with a rotor driven by a driving motor, which has a die plate as well as an upper and a lower guiding for upper and lower punches, which co-operate with bores of the die plate, a stationary housing closely surrounding the rotor, which constitutes a pressing room, and with at least one ring-shaped sealing arrangement, which seals the housing against a punch guiding, wherein the sealing arrangement has a ring-shaped holder inside the housing, wherein the ring-shaped holder is axially movable between a first and a second position by means of a stationarily arranged lifting device, the sealing arrangement has a first sealing portion, which is continuously in engagement with a first sealing surface of the housing in the first and in the second position, and a second sealing portion which is in engagement with a second sealing surface of the punch guiding with a first sealing force in the first position and is in engagement with the second sealing surface in the second position either with a second sealing force, which is smaller than the first sealing force, or is out of engagement with the same.

13 Claims, 3 Drawing Sheets

ROTARY TABLET PRESS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Rotary tablet presses have usually a rotor, which contains a die plate with individual die bores, and an upper and a lower punch guiding. Upper and lower punches are guided in the punch guiding, which co-operate with the die bores. In addition, cams for the punches are arranged above and below the rotor. Further, at least one pressing station is associated to the perimeter of the die plate, which presses the punches against each other with at least one pressing roller, in order to press the powder-like material in the die bores together. Finally, a filling device belongs to a rotary tablet press also, which fills the die bores running along with powder material. The pressed tablets are subsequently moved out of the die bores with the aid of the lower punches, and are removed by a strip-off device. The rotor is driven by a suitable driving apparatus, mostly an electric motor. A housing surrounding the described parts forms a pressing room, which prevents dust generated in the pressing from arriving in the surroundings. Vice versa, the housing prevents also the intrusion of contaminations into the pressing room.

From DE 10 2004 040 163, the entire contents of which is incorporated herein by reference, it has become known to integrate the electric motor into the rotor, while the motor's rotor lying at the outside is splinedly connected with the inner wall of the tablet press rotor, and the stator is stationarily supported in a suitable way. For this embodiment, it is no more necessary that a rotor shaft has to be guided into the housing for instance, which is driven via a gear box by a driving motor situated remotely below, or that the housing surrounds the drive also. Thus, a sealing for the rotor shaft does no more apply.

The parts located in the pressing room have to be cleaned from time to time. For this reason, it has become known from EP 0 288 798, the entire contents of which is incorporated herein by reference, to connect the holders of cams which control the punches with stationary housing portions via detachable connecting means, and to connect them with the die plate by take-along elements such that after detaching the connecting means, the die plate can be lifted off from the driving shaft, together with the upper and lower punches and the cams. Thus, the rotor can be removed completely from the rotary tabletting machine, for performing a cleaning externally. Also, back fitting of the machine can be performed in this way, to another punch distribution or only for other punches, for instance. The removability of a rotor is also treated in EP 1 050 399 A2, the entire contents of which is incorporated herein by reference.

From U.S. Pat. No. 4,259,049, the entire contents of which is incorporated herein by reference, it has become known to essentially seal the proper pressing region for upper and lower punches by housing portions. A source of negative pressure is connected to the housing parts, in order to suck off the dust which is generated in the two pressing rooms. Air supplementation takes place from the outside via channels in the punch guidings. From U.S. Pat. No. 6,676,836 B2, the entire contents of which is incorporated herein by reference, it has further become known to encapsulate the rotor into an essentially sealed housing, in order to protect the pressing room or to prevent the dust generated in the pressing room from arriving in the outside. In this state of the art, it is also known to separate the rotor together with the enclosing housing from the remaining parts of the press, so that the unit can be transported to a cleaning station, in which all the cleaning processes are performed.

In order to achieve a sealing between the housing and the surroundings which is as good as possible, the already mentioned U.S. Pat. No. 6,676,863 the entire contents of which is incorporated herein by reference, provides lip sealings, which are mounted on the rotor and the upper and lower punch guiding, respectively, with the aid of a suitable holder, and which frictionally co-operate with the housing. A disadvantage of the dragging seals is that wear and heat generation take place.

The present invention is based on the objective to provide a rotary tablet press, in which an effective sealing, with little wear and little friction, of a housing of the rotor is achieved.

BRIEF SUMMARY OF THE INVENTION

In the present invention, the ring-shaped holder is axially movable between a first and a second position by means of a stationarily arranged lifting device. The sealing arrangement has a first sealing portion, which is continuously in engagement with a first sealing surface of the housing in the first and in the second position. A second sealing portion is in engagement with a second sealing surface of the punch guiding with a first sealing force in the first position. In the second position, it is in engagement with the second sealing surface either with a second sealing force, which is smaller than the first sealing force, or it is out of engagement with the same.

The first position corresponds to the condition of the rotary tablet press in the standstill. The sealing arrangement seals the housing completely against the outside. Through this, cleaning can be performed also when the rotor remains built in, wherein it is prevented that cleaning agents, inclusive of contaminations, arrive in the outside. In the second position of the lifting device, the sealing arrangement is in secure engagement with the housing only, whereas either a minimal gap or a weak abutting is set with respect to the punch guiding. Through this, a sufficient sealing is still obtained in the operation, which prevents dust from leaking out, in particular when the housing is connected to a source of negative pressure in the operation according to one embodiment of the present invention. The lifting device can act pneumatically, by an electric motor, an electric magnet, hydraulically or the like. The control of the lifting device can be connected to the control unit for the rotary tablet press, by which both sealing portions are automatically kept in sealing engagement in the standstill, whereas in the operation, one of the two seal engagements is weakened or completely suspended.

A further advantage of the present invention is that the existing seals are free of wear in a high degree and that they do not develop unnecessary heat.

Disassembling the rotor for cleaning purposes or for changing the punches is not necessary. Thus, a fixed housing may be used. The housing minimizes the processing room, which in turn reduces the cleaning expenditure. Parts outside the processing room remain clean and can be made from materials which are not corrosion resistant.

Advantageous further embodiments are indicated in further subclaims.

According to one embodiment of the present invention, both sealing portions are constituted by one sealing ring. The sealing ring can be uniformly made from the same elastic material. However, it may be made of sealing portions from different sealing materials, wherein at least two layers are fixedly connected with each other, either by glueing or by adhesion during the production process.

According to a further embodiment of the present invention, a holding ring arranged radially inside the sealing ring is provided, and the sealing ring has a groove or a ring rib on the perimeter, and the holding ring has a ring rib or a groove which can be brought into non-positive and/or positive engagement. In the movement of the holding ring, the same takes along the sealing ring automatically.

The sealing ring can be arranged or formed, respectively, such that in the first position of the lifting device, it produces engagement by prestress of both sealing portions with the housing and the punch guiding, respectively. In the shift into the second position, the sealing portion co-operating with the housing is then deformed further, until that sealing portion which is in engagement with the punch guiding reduces or suspends the engagement, respectively. The sealing portions may be formed by sealing lips.

A particularly advantageous embodiment of the present invention is that the lifting device is constituted by an inflatable sealing, which is arranged on the housing and to which sits close a lifting ring, which is connected to the ring-shaped holder. The lifting ring can be connected to the ring-shaped holder via plural bolts spaced apart in the perimeter distance. It is particularly advantageous when according to a further embodiment of the present invention, a channel connected to a stationary source of pressurised air runs out near to the location of engagement of the second sealing portion with the second sealing surface, outside of the pressing room.

According to a further embodiment of the present invention, the lifting ring can have a ring channel connected to the source of pressurised air, which is connected to an axial bore in the holding bolts, and the axial bores can be connected to axis parallel bores in the holding ring, which run out near to the second sealing surface.

It is advantageous when such a sealing arrangement is assigned to the upper as well as to the lower punch guiding of the rotor.

BRIEF DESCRIPTION OF EACH OF THE DRAWINGS

The present invention is explained in more detail in the following by means of drawings, which represent an embodiment of the invention in an exemplary manner.

DETAILED DESCRIPTION OF THE INVENTION

Figure 1:
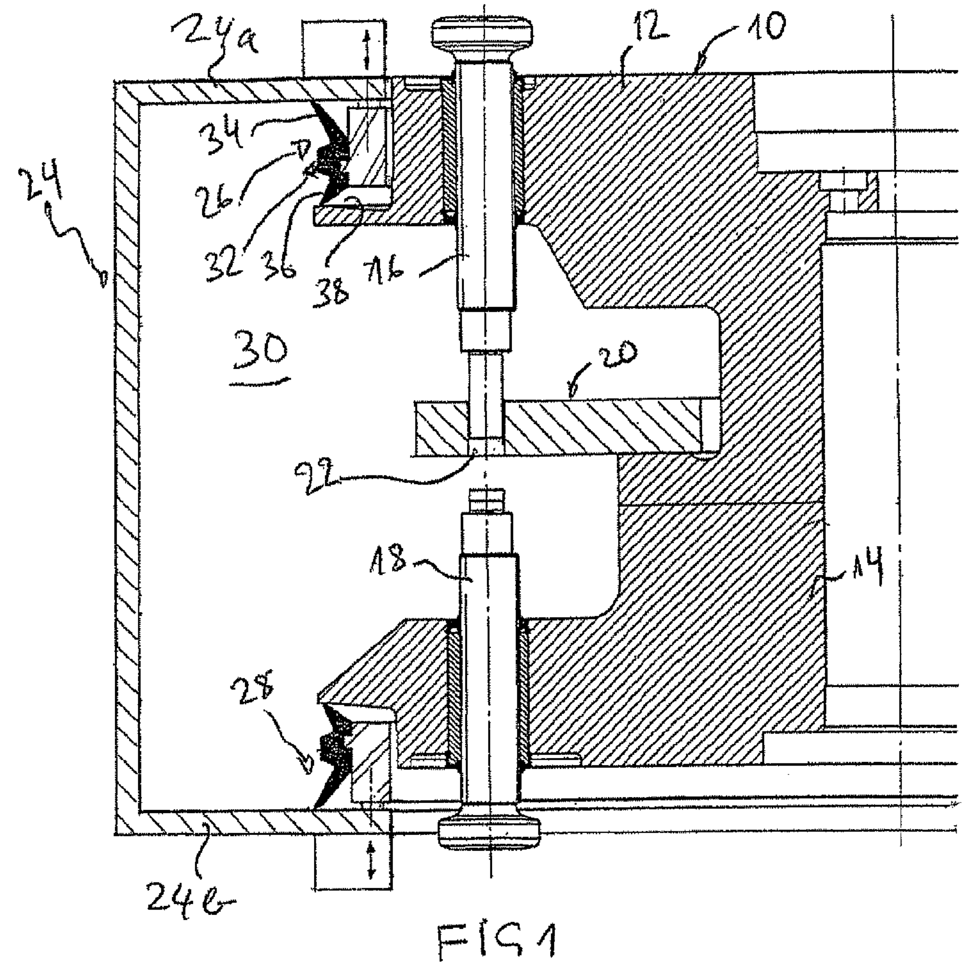
FIG. 1 shows a section through a part of a rotor for a rotary tablet press, with a sealing arrangement according to the present invention.

While this invention may be embodied in many different forms, there are described in detail herein a specific preferred embodiment of the invention. This description is an exemplification of the principles of the invention and is not intended to limit the invention to the particular embodiment illustrated FIG. 1 shows a rotor 10 of a rotary tablet press not shown in more detail, like the same is known in its principal construction. The rotor has an upper punch guiding 12 as well as a lower punch guiding 14 for upper punches 16 and lower punches 18, respectively. In any case, only one pair of punches is represented in FIG. 1. The rotor has also a die plate 20, which can be composed of plural segments for instance, as is per se known. The die plate 20 has die bores 22, through which the upper and lower punches 16, 18 co-operate.

A housing 24 surrounds the rotor 10 across its entire perimeter. Its upper wall 24*a* is on the same height as the upper side of the upper punch guiding 12. Its lower wall 24*b* has a minimal distance from the lower side of the lower punch guiding 14. The housing 24 is stationarily held in the frame (not shown) of the tablet press. Inside of the housing 24, an upper sealing arrangement 26 and a lower sealing arrangement 28 are shown. They seal the housing 24 with respect to the rotor 10, and with it against the outside, so that the processing room 30, which is formed between rotor 10 and housing 24, is closed with respect to the surrounding. Dust generated during the processing is not carried towards the outside.

In the following, only the upper sealing arrangement 26 is treated, wherein the sealing arrangement 28 is constructed completely equally, however.

The sealing arrangement 26 has a sealing ring formed in one piece, with an upper lip 34 and a lower lip 36. The upper lip 34 sits close to an assigned sealing surface of the housing 24. The lower sealing lip 36 sits close against a sealing surface 38 of a portion of the upper punch guiding 12.

Figure 2:
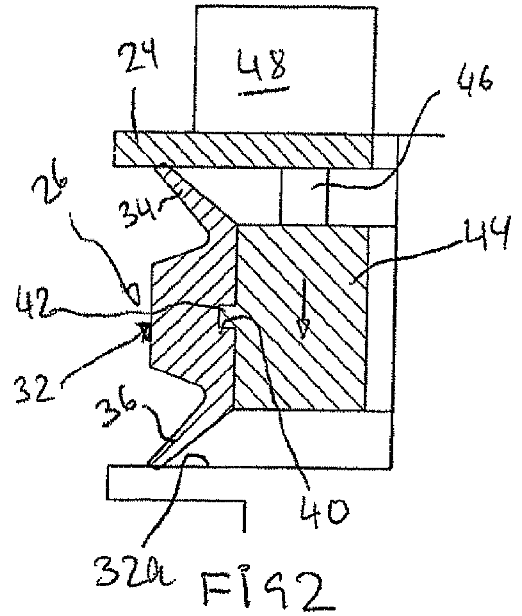
FIG. 2 shows the upper sealing arrangement according to FIG. 1 in a first position.

As can be recognised in FIGS. 1 and 2 in particular, on the side facing the punch guidings, the sealing ring 32 has a groove 40, rectangular in the cross section, into which engages a complementary, ring-shaped rib 42 of a holding ring 44 for the sealing ring 32. The holding ring 44 is connected to a lifting device 48 on the housing 24 via a bolt 46. As can be further recognised from FIGS. 2 and 3, the sealing ring 32 can be brought into two positions with the aid of the lifting device 48. FIG. 2 shows a first position, in which both sealing lips are in engagement with the assigned sealing surfaces under self-contained stress. Thus, the processing room 30 is completely sealed against the surrounding. In a second position according to FIG. 3, the holding ring 44 is somewhat lifted. As a consequence, the sealing lip 34 is deformed a little bit more, and the sealing lip 36 is minimally lifted from the assigned sealing surface 32*a*. A minimal gap 50 is formed. Therefore, a complete sealing with respect to the rotor 10 is no more given. However, this can be tolerated, in particular when a negative pressure is permanently generated in the processing room 30, which additionally prevents that dust generated in the processing room 30 arrives in the outside.

Figure 4:
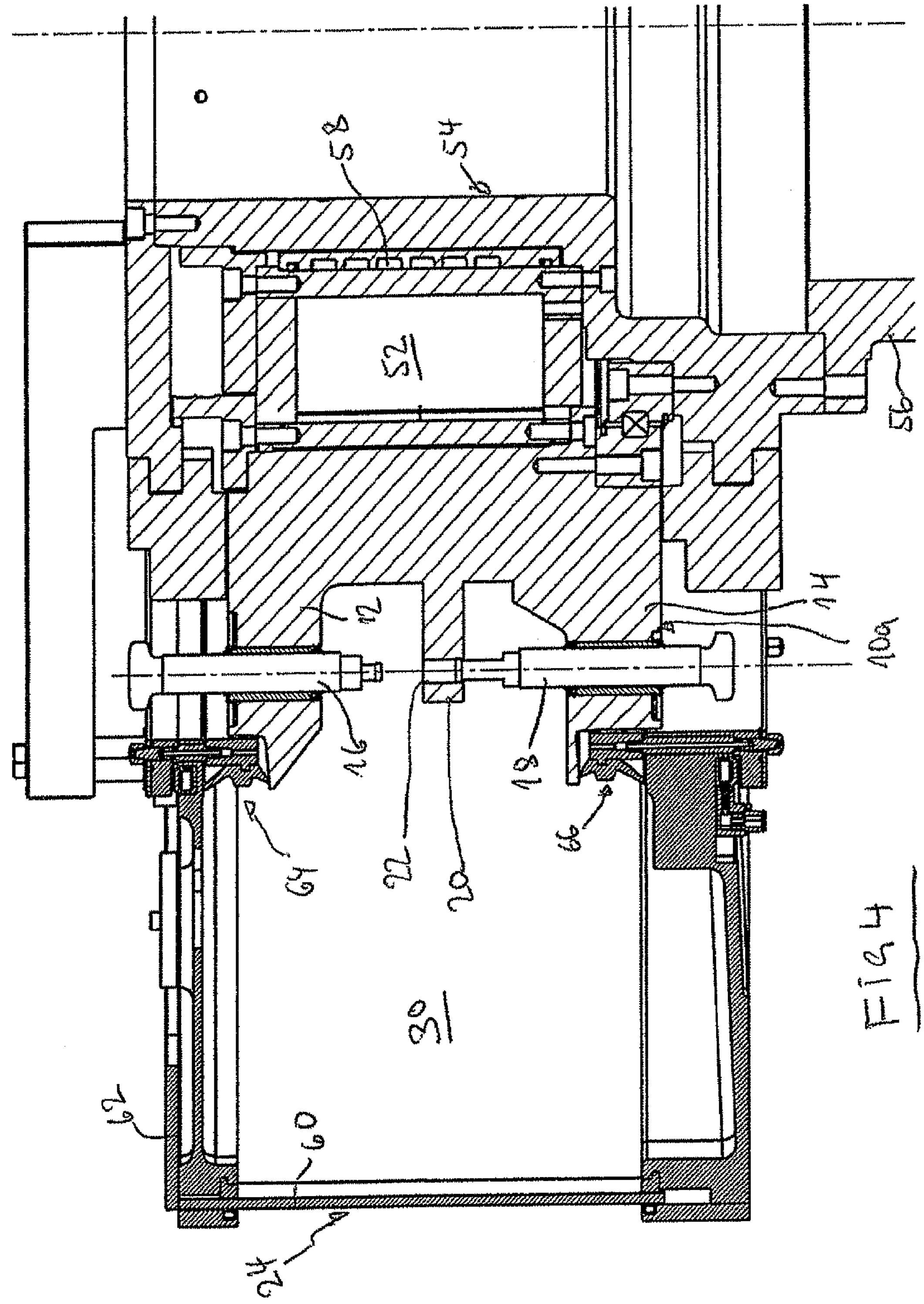
FIG. 4 shows a partial section of a rotor of a rotary tablet press with more details than in FIG. 1.

As far as equal parts like in FIG. 1 are shown in the embodiment according to FIG. 4, they are provided with equal reference signs.

A rotor 10*a* is shown in FIG. 4, which is driven by an electric drive motor 52 which is integrated into the inner space of the rotor 10*a*. The motor is not shown in detail. The externally lying rotor of the motor is splinedly coupled to the rotor 14, while the motor stator is connected to a cylindrical bearing portion 54, which stands on a column 56. The arrangement of cooling grooves is shown at 58, which serve for cooling the motor 52.

The housing 24 of the embodiment according to FIG. 4 will not be described in more detail. It shall be mentioned only that side wall portions 60, which are connected to a ceiling portion 62 on their upper sides, can be lifted in order to gain access to the pressing room 30. The lifting device for this is not depicted.

Figure 5:
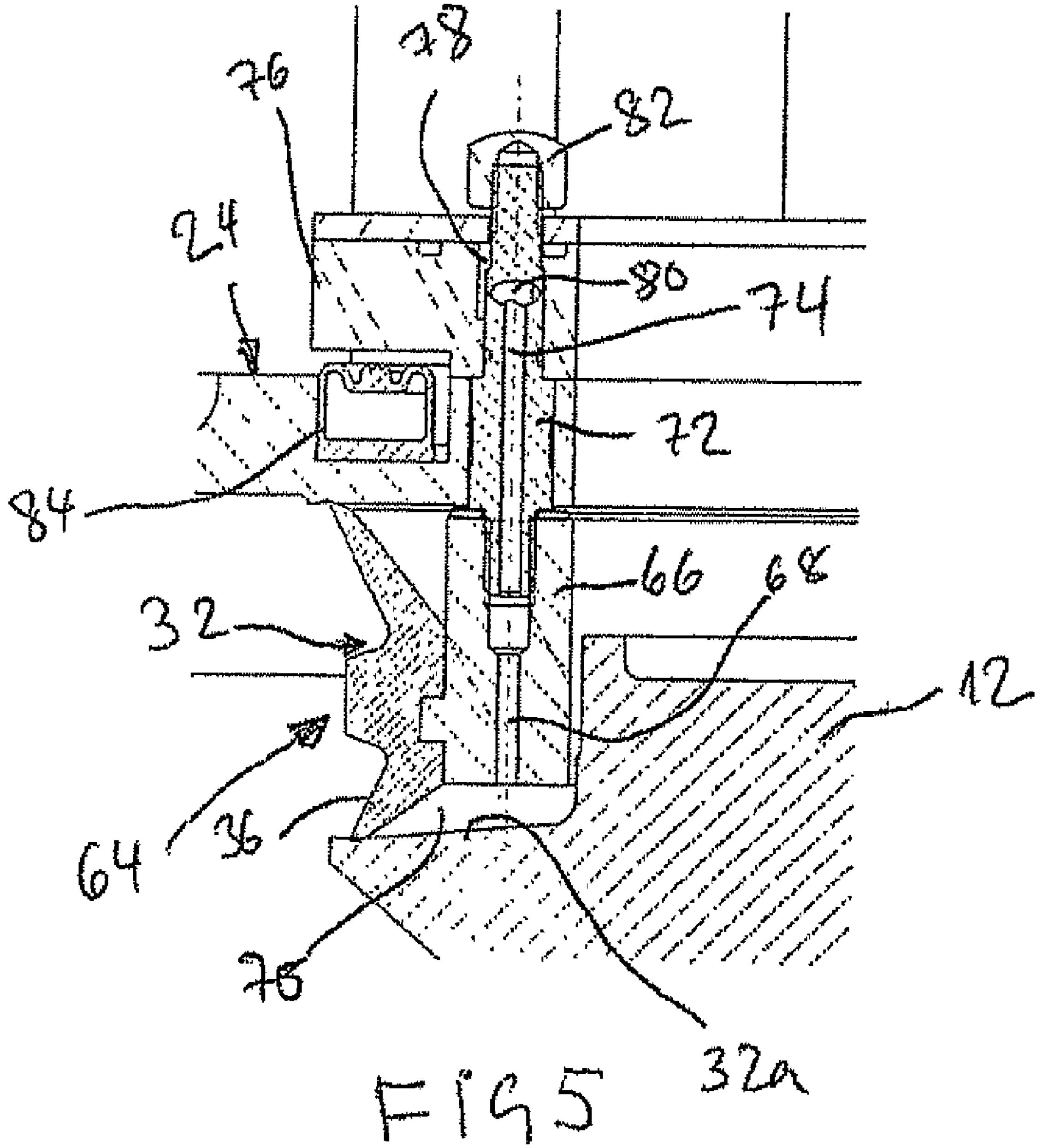
FIG. 5 shows the upper sealing arrangement according to FIG. 4 in an enlarged representation.

The sealing of the processing room 30 takes place with the aid of sealing arrangements 64, 66, from which the former will be described in more detail by means of FIG. 5.

Figure 3:
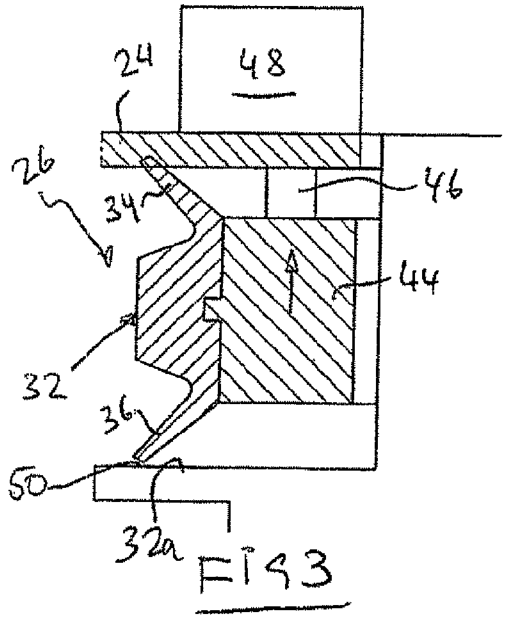
FIG. 3 shows the sealing arrangement according to FIG. 2 in a second position.

The sealing arrangement 64 has an upper sealing ring, which is similar to the sealing ring according to FIGS. 1 to 3. For this reason, it is designated as 32 again. A holding ring 66 co-operates in the same manner with the sealing ring 32, as has been described in the context of FIGS. 1 to 3. The holding ring has an axial through bore 68, which runs out in a circumferential ring space 70, which delimited by the sealing lip 36, the sealing surface 32*a*, the holding ring 66 and a further portion of the punch guiding 12. In FIG. 5, it is shown how a bolt 72 is screwed into the holding ring, which has also an axial bore 74, which is aligned to the axial bore 68. The bolt 74 extends through a bore of a lifting ring 76, which extends above the upper ceiling portion of the housing 24. The lifting ring 76 has a ring chamber 78 which extends annularly in the ring 76. Plural such bolts 72 are arranged in perimeter distances. A transverse bore 80 at the upper end of the axial bore 74 is in communication with the ring space 78. The ring space on its turn is in communication with a pressure source, which is not shown here. On the upper portion of the bolt 72, projecting over the lifting ring 76, a nut 82 with a sealing ring is screwed up.

In the ceiling portion of the housing 24 is arranged an inflatable sealing 84 immersed in a groove, which is in communication with a pressure source. It may be the same pressure source which is in communication with the ring space 78. The inflatable sealing 84 sits close to the lifting ring 76 from the downside. When pressurised air is supplied into the sealing 84, the lifting ring is lifted somewhat through this, which lifts the holding ring also via the pins 72 in order to shift the sealing ring 32 into a second position, as has been described in FIG. 3, namely to form a minimal gap with respect to the sealing surface 32*a*. It is to be understood that a valve is arranged between the source of pressurised air, whose actuation is controlled by the control unit of the tablet press. The same holds also for the supply of pressurised air as barrier air into the ring space 70 (FIG. 5).

During the standstill of the rotor 10 or 10*a*, respectively, the sealing 32 has the position depicted in FIG. 2, and thus it seals the pressing room 30 completely against the surrounding. Through this, no cleaning liquid arrives in the outside also, when the parts of the press are washed with a suitable cleaning agent. When the rotor 10 comes into operation, the holding ring 44 or 66, respectively, is lifted to the position depicted in FIG. 3 with the aid of the lifting device 48 or of the inflatable sealing 84, respectively, so that there is no substantial friction of the sealing lip 36 on the sealing surface 32*a*. A negative pressure is generated in the processing room 30, which prevents that dust arrives in the outside via the optionally minimal gap between sealing lip 36 and sealing surface 32*a*. This is supported by the fact that pressurised air is blown into the circumferential ring space 70 via the axial bores 74, 68, which enters the pressing room 30 via the minimal gap and generates a barrier effect by doing so.

The above disclosure is intended to be illustrative and not exhaustive. This description will suggest many variations and alternatives to one of ordinary skill in this art. All these alternatives and variations are intended to be included within the scope of the claims where the term “comprising” means “including, but not limited to”. Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A rotary tablet press, with a rotor driven by a driving motor, which has a die plate as well as an upper and a lower guiding for upper and lower punches, which co-operate with bores of the die plate, a stationary housing closely surrounding the rotor, which constitutes a pressing room, and with at least one ring-shaped sealing arrangement, which seals the housing against a punch guiding, wherein the sealing arrangement has a ring-shaped holder inside the housing, characterised in that the ring-shaped holder is axially movable between a first and a second position by means of a stationarily arranged lifting device (48), the sealing arrangement (26, 28) has a first sealing portion, which is continuously in engagement with a first sealing surface of the housing (24) in the first and in the second position, and a second sealing portion which is in engagement with a second sealing surface (32*a*) of the punch guiding (12) with a first sealing force in the first position and is in engagement with the second sealing surface (32*a*) in the second position either with a second sealing force, which is smaller than the first sealing force, or is out of engagement with the same.

2. A rotary tablet press according to claim 1, characterised in that both sealing portions are constituted by one sealing ring (32).

3. A rotary tablet press according to claim 2, characterised in that the sealing ring (32) consists uniformly of elastomeric or elastic material.

4. A rotary tablet press according to claim 2, characterised in that a holding ring (44, 46) arranged radially inside the sealing ring (32) is provided, and that the sealing ring (32) has a groove (40) or a ring rib, and the holding ring (44, 46) has a ring rib (42) or a groove, for non-positive and/or positive engagement of the parts.

5. A rotary tablet press according to claim 2, characterised in that in the first position of the lifting device (48), the sealing ring (32) is with both sealing portions in engagement by prestress with the housing (24) and the punch guidings (12, 14).

6. A rotary tablet press according to claim 1, characterised in that the sealing portions are constituted by sealing lips (34, 36.

7. A rotary tablet press according to claim 1, characterised in that the lifting device is constituted by an inflatable seal (84), which is arranged on the housing (24) and to which sits close a lifting ring (76), which is connected to the ring-shaped holder.

8. A rotary tablet press according to claim 7, characterised in that the lifting ring (76) is connected to the ring-shaped holder via plural bolts (72) spaced apart in the perimeter distance.

9. A rotary tablet press according to claim 1, characterised in that a stationary source of pressurised air runs out with a channel near to the engagement location of the second sealing portion with the second sealing surface (32*a*) outside the pressing room (30).

10. A rotary tablet press according to claim 8, characterised in that the lifting ring (76) has a ring channel (78) connected to the source of pressurised air, which is connected to an axial bore (74) in the holding bolts (72), and the axial bores (74) are connected to axis parallel bores (68) in the holding ring (66), which run out near to the second sealing surface (32*a*).

11. A rotary tablet press according to claim 1, characterised in that the upper and the lower punch guidings (12, 14) each at a time have a ring-shaped holder with a sealing arrangement.

12. A rotary tablet press according to claim 1, characterised in that a source of negative pressure is connected to the housing (24).

13. A rotary tablet press according to claim 1, characterised in that the housing (24) houses only the rotor (10, 10*a*), wherein a drive motor for the rotor (10, 10*a*) is integrated into the rotor.

* * * * *